United States Patent [19]

Kristinsson

[11] Patent Number: 4,583,265
[45] Date of Patent: Apr. 22, 1986

[54] DEVICE FOR PROCESSING FISH HEADS

[75] Inventor: Sigurdur Kristinsson, Saudarkrókur, Iceland

[73] Assignee: Nordischer Maschinenbau Rud. Baader GmbH & Co. Kg, Lubeck, Fed. Rep. of Germany

[21] Appl. No.: 619,039

[22] Filed: Jun. 11, 1984

[30] Foreign Application Priority Data

Jun. 16, 1983 [IS] Iceland ................................. 2818

[51] Int. Cl.4 ............................................. A22C 25/14
[52] U.S. Cl. ............................................. 17/55; 17/58
[58] Field of Search ......................... 17/55, 61, 58, 59

[56] References Cited

U.S. PATENT DOCUMENTS 2,862,606 12/1958 Schlichting ..................... 17/55 X
4,503,588 3/1985 Palmason ........................... 17/61

FOREIGN PATENT DOCUMENTS 1073779 6/1967 United Kingdom ................. 17/61

Primary Examiner—Willie G. Abercrombie
Attorney, Agent, or Firm—Thomas R. Morrison

[57] ABSTRACT

The invention concerns a device for processing fish heads, especially for separating pieces suitable for human consumption, especially the cheeks, the chin flesh and the tongue resp. the gills, the latter being unsuitable for human nutrition. The device is characterized in that a feeding trough receiving the fish head in swimming position is provided, a feeler being arranged at its end to activate a conveyor which engages the fish head behind the lower jaw while opening the pharynx and pushes it on the spear-shaped end of a guide. In the region of the guide the fish head is taken over by a conveyor extending over and along the guide and guided to a cutting device for separating the fish head, the gills being ripped out beforehand by spreading flaps arranged on the flanks of the guide.

10 Claims, 10 Drawing Figures

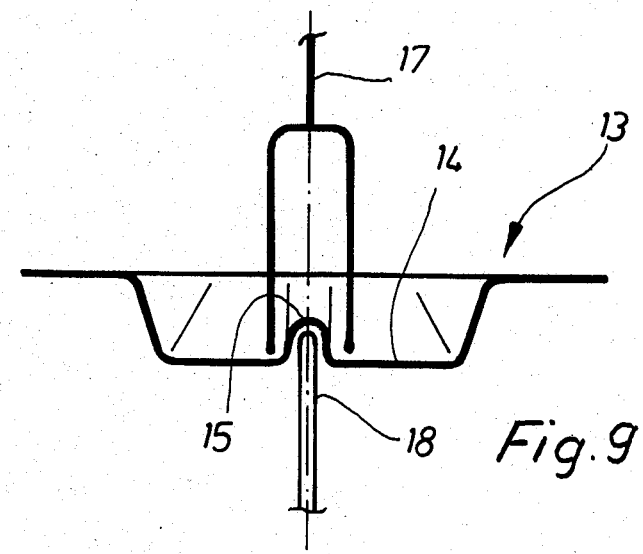
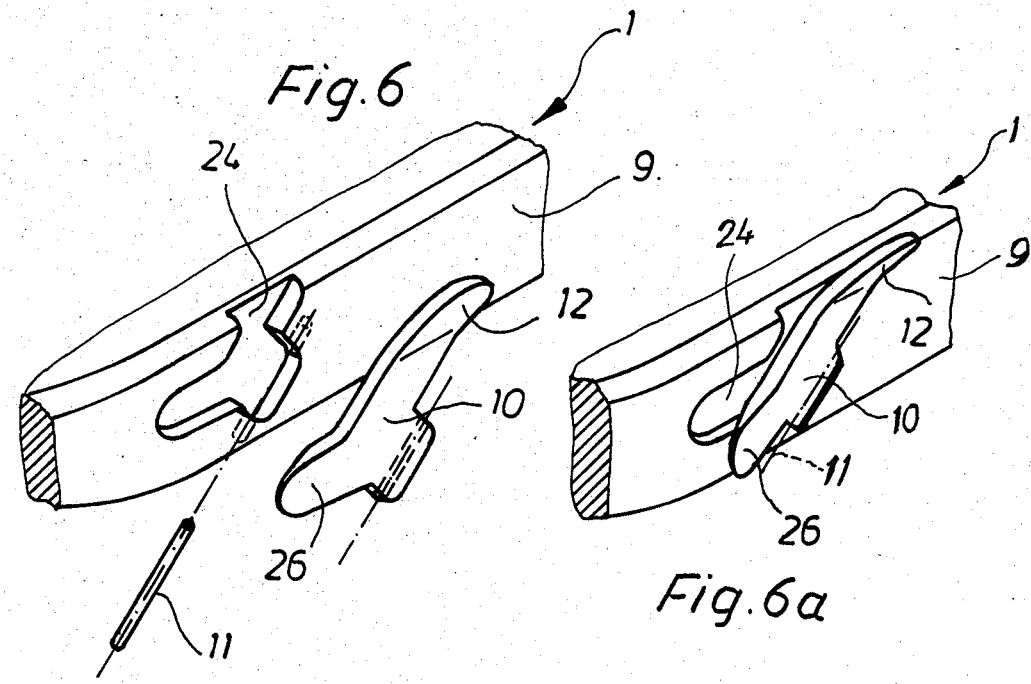

DEVICE FOR PROCESSING FISH HEADS

BACKGROUND OF THE INVENTION

1. Field of the Invention

The invention concerns a device for processing fish heads, especially for severing parts suitable for human consumption resp. parts unsuitable for this purpose from the fish head, the device comprising a guide having a spear-shaped end for receiving the fish heads in the direction of their longitudinal axis, means for conveying the fish heads along the guide in a feeding direction, a feeding trough arranged upstream of the guide, and with a cutting device associated to the guide.

2. Description of Prior Art

It is always endeavoured to use the precious raw material fish as fully as possible and in the form of the most valuable products possible. After the optimum yield of fish fillets has been achieved the problem of gaining the fish parts sticking to the skull resp. positioned therein is being tackled in order to present these parts for human nutrition. Especially of interest are the cheeks esteemed for their tender flesh, the chin flesh suitable for the manufacture of fish stuffing and the tongue especially esteemed as a delicacy.

The gaining of these parts has occurred manually up to now, but considerations for a mechanisation of this process have become known.

E.g. a device is known which shows a cutting device comprising two circular knives placed roof-shaped to each other to which knives a guide provided with a spear-shaped end is associated. The fish head to be processed and guided by this guide by penetration of its pharynx is led to the cutting device by means of a conveyor equipped with spikes, which cutting device makes an incision which is essentially tangential to the lower edge of the eye socket and separates the lower jaw together with the chin flesh, the tongue and the cheeks.

Besides the uneconomical feedability plus great technical security risk it is also a disadvantage that undesired gill parts stick to both pieces, the removal of which makes an extra working step necessary.

3. Objects of the Invention

It is therefore a main and essential object of the present invention to suggest an improved device which is able to divide fish heads at a fast rate, special attentiveness with respect to the alignment in the course of the feeding not being necessary.

It is a further object of the invention to be able to remove the gills totally and economically.

SUMMARY OF THE INVENTION

According to the invention this object is achieved by a device comprising a guide having a spear-shaped end for receiving the fish heads in the direction of their longitudinal axis, means for conveying the fish heads along the guide in a feeding direction, a feeding trough arranged upstream of the guide, and a cutting device associated to the guide, in which device an extra conveyor activatable by the fish head laid in the feeding trough is arranged between the feeding trough and the spear-shaped end of the guide and has at least one entraining element, which entraining element is moveable from a rest position directly adjacent to the end of the feeding trough facing the spear-shaped guide end by grasping behind the lower jaw arch of the fish head in the direction towards the spear-shaped end and almost tangential to the lower flank of the guide. The advantages which can be achieved thereby consist especially in avoiding the deficiencies inherent in the known device.

The additional conveyor can preferably comprise an oscillating crank which is mounted pivotal about an axis arranged transverse to the conveying direction of the fish heads below the guide and can also be provided with an entraining element at its free end extending into the path of the fish heads. Thus a relatively simple structure is obtained for safeguarding a guide and, if necessary, timed feeding of the fish heads to the cutting device.

With respect to an improving the security conditions, as well as of the insensitivity of the function of the device when the operation (by a person) is negligent, it is advantageous that the feeding trough be provided with a guide edge which extends along its middle, is formed tunnel-shaped, extends upwards from the bottom of the feeding trough and supports the fish head with respect to its lower jaw between the jaw bones of the lower jaw arch.

By providing a feeling device, which can be displaced the fish head, above the guide edge facing the guide enables an activation of the device by each fish placed in it, one working cycle of the oscillating crank always comprising a movement from the rest position and returning thereto.

By having spreading flaps lying flush in the lateral flanks of the guide in the region of its spear-shaped end, which spreading flaps are spread apart resiliently in such a manner by the fish head carried by means of the guide due to the penetration of its pharynx that, gliding on the inside of the gill covers, they are led between these and the gill arches connected to each other at the isthmus, it is possible to rip out the gill arches from the head area without the additional expense of controlling means.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

FIG. 6 is an enlarged exploded view, in axonometric representation, of the forward portion of the fish guide showing the manner in which one of the spreading flaps is pivotally mounted thereon, the spreading flap being shown in a non-activated orientation;

FIG. 6a is an enlarged axonometric view similar to FIG. 6, but showing the spreading flap mounted on the guide and in an activated position;

FIG. 9 is an enlarged cross sectional view of the device as taken along section line I of FIG. 8.

DETAILED DESCRIPTION OF THE PREFERRED EMBODIMENT

Figure 1:
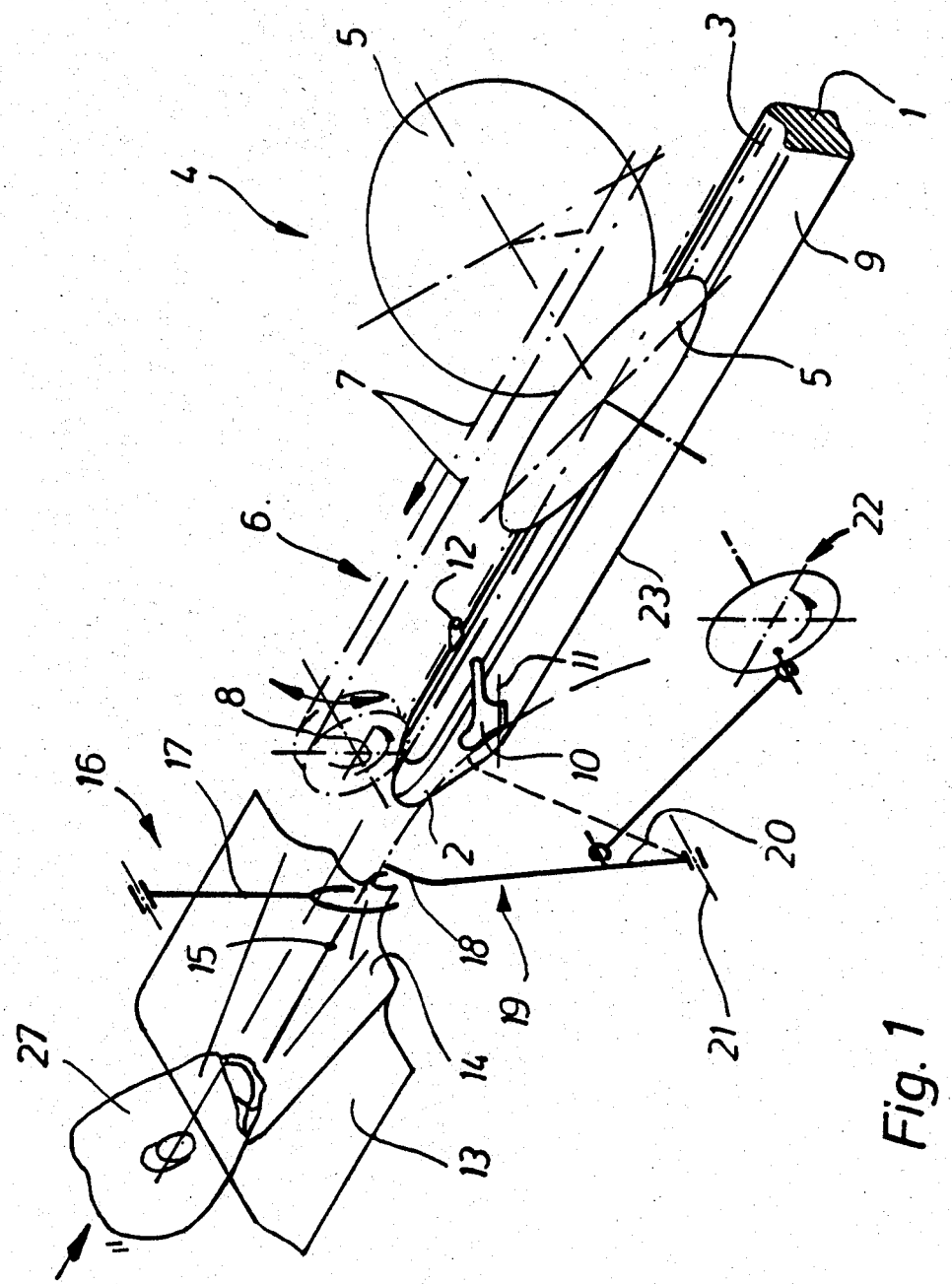
FIG. 1 shows a partial view of the device according to the invention in axonometrical representation.
Figure 5:
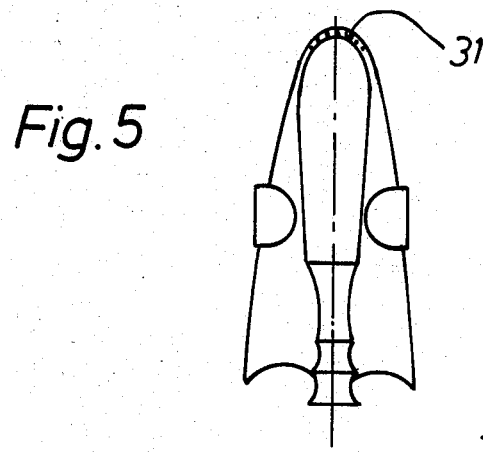
FIGS. 3 to 5 show the cutting result of the device of FIG. 1, FIG. 3 showing the gills, FIG. 4 the chin part, and FIG. 5 the upper skull part.

A guide 1 determining the path of a fish head 27 and having a spear-shaped end 2 extending essentially horizontally is arranged in a non-shown frame of a device for processing fish heads. The guide 1 has approximately rectangular cross-section with rounded edges and is provided with a groove 3 on its upper side. A cutting device 4 comprising a pair of circular knives 5 inclining upwardly in a roof-shaped manner and driven in a suitable manner is arranged above the rear part of the guide 1 connected to the frame, the circular knives 5 using the guide 1 in the course of the groove 3 as means for resisting the cutting forces. A conveyor 6 comprising a pair of conveyor belts 7 arranged symmetrically above the plane of symmetry of the guide 1 extends longitudinally above the whole of the guide 1. The conveyor belts 7 are driven in a suitable manner and deflected endlessly about deflection wheels 8 mounted above the spearshaped end 2 and not-shown drive wheels positioned above the rear part of the guide 1. The conveyor belts 7 carry not-shown spikes and can be deflected vertically by their own weight or resilience. As shown in FIG. 1, a spreading flap 10 is provided in each of the lateral flanks 9 of the guide 1 in the region of the spear-shaped end 2.

As can best be seen in FIGS. 6 and 6a, each spreading flap 10 is pivotally mounted at a respective lateral flank 9 of the guide 1 about a pivot axis provided by a pivot pin 11. This pivot axis 11 is inclined relative to the longitudinal axis of the guide 1, as shown in FIGS. 1, 6 and 6a. The spreading flap 10 is formed with an upper extension 12 which projects above the upper edge of the lateral flank 9, and a lower spreader extension 26. As shown in FIGS. 6 and 6a, and lateral flank 9 is formed with a cavity 24 through which the pivot axis 11 extends. The cavity 24 2is sized and shaped to receive therein the spreading flap 10, its lower spreader extension 26 and the lower portion of its upper extension 12, with the outer surfaces of these parts lying flush with the outer surface of the lateral flank 9 when the spreading flap 10 is in its normal, non-activated position shown in FIG. 1. Because of its pivotal mount about the inclined pivot axis 11, each spreading flap 10 can be spread out resiliently to the extended activated position shown in FIG. 6a, by the influence of a force exerted by a passing fish head on the upper extension 12 which projects above the top side of guide 1.

Figure 7:
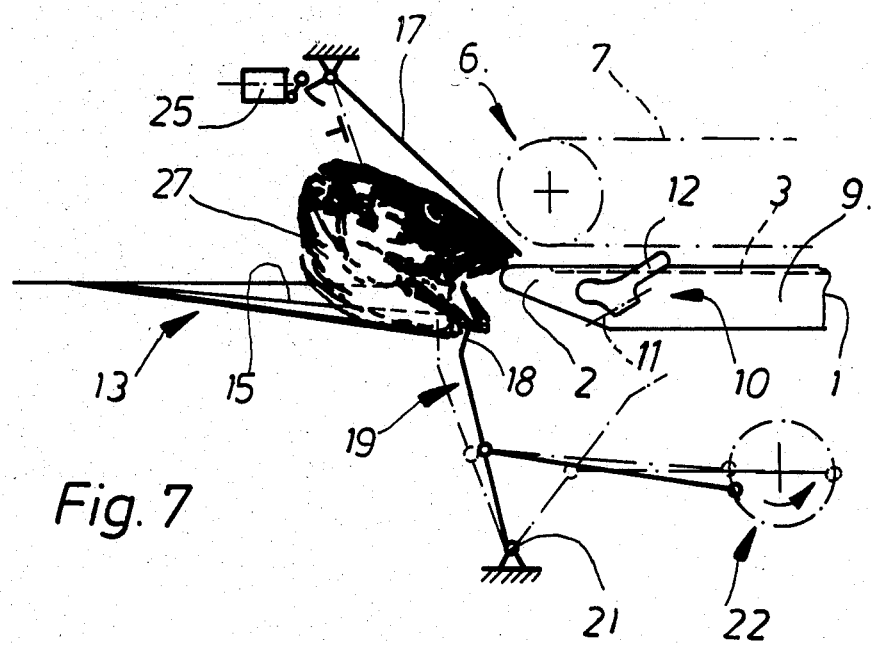
FIG. 7 is an enlarged partial schematic side view of the device, showing a fish head seized by its lower jaw for conveying.
Figure 8:
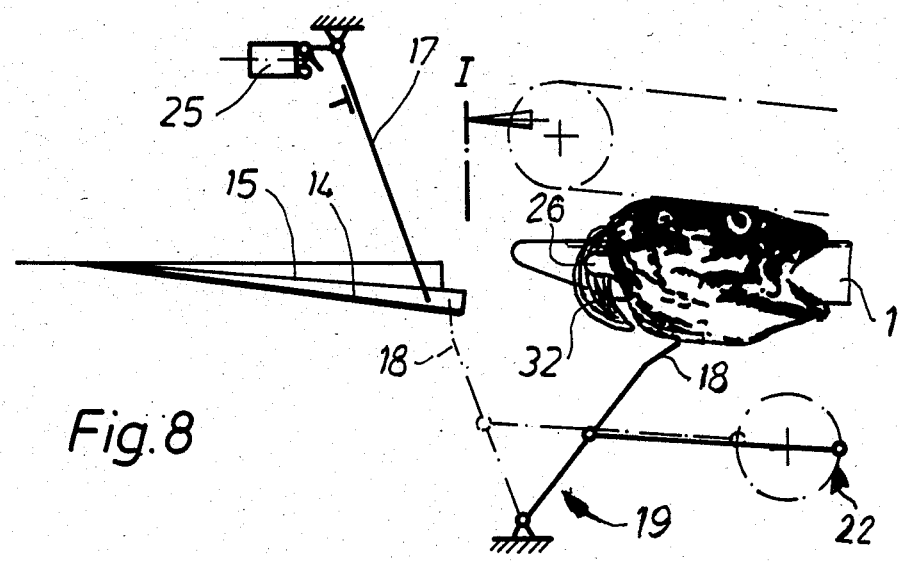
FIG. 8 is an enlarged partial schematic side view of the device similar to FIG. 7, but showing the fish head in a subsequent stage of the operation, with the fish head pushed onto the guide after removal of its gills.

A feeding trough 13 is positioned in front of the spear-shaped end 2 of the guide 1. The trough 13 is aligned with its longitudinal axis lying flush with the guide 1 and has a tunnel-shaped guiding edge 15 extending longitudinally and beyond the bottom trough 14, which edge 15 is directed hornlike against the spear-shaped end 2 of the guide 1. In this region the guiding edge 15 is encompassed by a fork-shaped feeler 17 of a feeling device 16. As can be seen in FIGS. 7 and 8, in connection with FIG. 9, the feeler 17 is positioned to engage and actuate the switch of a conventional electrical limit feeler 25 which is electrically connected, in a well-known manner, to the driving means of a crank mechanism 22. The driving means are controlled by suitable means, well knwon in the art, to rotate once in every working cycle upon actuation by the feeler 17 through the electrical limit feeler 25. Also positioned in this region of the guide edge 15 are a conveyor 19 with an entraining element 18 engaging in the tunnel-like groove from below, which conveyor 19 is formed as an oscillating crank 20 pivotal about an axis 21 arranged transverse to the conveying direction of the fish heads and below their path, and a not-shown hold-down device above the guide edge 15. The driving of the oscillating crank 20 occurs by the crank mechanism 22. The path of the entraining element 18 is thereby so determined that the element 18 is almost tangential to a lower flank 23 of the spear-shaped end 2 of the guide 1.

Figure 2:
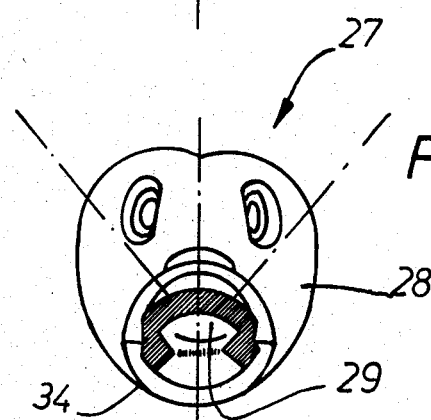
FIG. 2 shows a fish head with opened pharynx.
Figure 4:
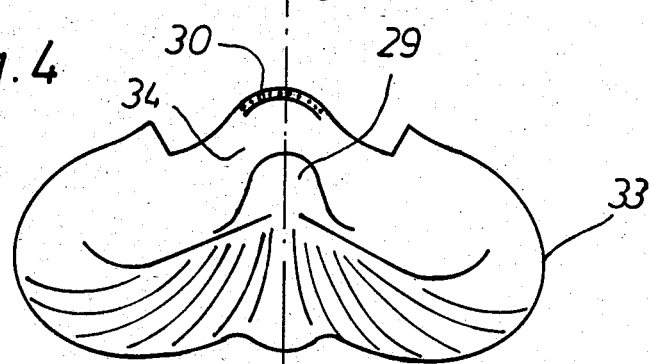
Figure 3:
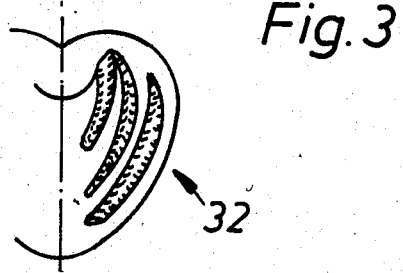

The method of operation of the device is the following:

A fish head 27 to be processed is laid on the feeding trough 13 in its (natural) swimming position and swimming direction and guided by the guiding edge 15 with its chin flesh 34 pressed in by the pressure of the not-shown hold-down device between the jaw bones of its lower jaw 30. Due to pushing, the fish head 27 begins to displace the feeler 17, the lower jaw arch reaching beyond the hornlike end of the tunnel-shaped guide edge 15 shortly before the forward break-over point so that the lower jaw arch comes to rest beyond this end. The crank mechanism 22 which is activated shortly thereafter by reaching the break-over point pulls the oscillating crank 20 in the direction of the spear-shaped end 2 of the guide 1, the entraining element 18 hooking behind the lower jaw arch so that the fish head 27 is entrained, in the manner shown in FIG. 7. A moment occurs due to the path of the entraining element 18, which moment opens the pharynx of the fish head and can be increased by a laterally effective pair of not-shown guiding flaps so that the spear-shaped end 2 can penetrate the pharynx. In this process the conveying belts 7 of the conveyor 6 grip the fish head 27 and pull it onto the guide 1, as shown in FIG. 8. The head then meets with the upper extensions 12 of the spreading flaps 10 lying flush in the lateral flanks 9 and effects their displacement so that the lower spreader 26 of the spreading flaps 10 come to engage the inside of the cheeks 28 resp. of the gill covers 33. In this position the spreading flaps 10 grasp behind the gills 32, the latter being ripped out in the further course of the conveying (see FIG. 8). During this process the fish head 27 moved further at constant speed by the conveyor 7 has moved out of the conveying engagement of the entraining element 18 since in the moment of the transfer of the fish head 27 to the conveyor 6 the entraining element 18 enters the delay phase of its sinusoidal speed process and remains behind in comparison with the fish head 27 moved forwards at the speed of the conveyor 6. After reaching the end position of the oscillating crank 20 the entraining element 18 is thus in a position, on its return run, to strip the gills 32, which are separated from the head, from the guide 1 against the working direction of the device. Meanwhile the fish head 27 is guided to the cutting device 4 which carries out a division of the fish head 27 corresponding to the cutting direction indicated in FIG. 2.

By providing suitable further knives a separation can be achieved which enables the gaining of single pieces in any desired manner.

What is claimed is:

1. A device for processing fish heads defining a plane of symmetry, having at least jaw bones defining a lower jaw with a lower jaw arch and an isthmus in the rear end of the head, a pharynx and gills including gill covers and gill arches connected at said isthmus, especially for severing parts suitable for human consumption from parts unsuitable for this purpose from the fish head, said device comprising guide means having a spear-shaped end for receiving the fish heads in the direction of their plane of symmetry, means for conveying said fish heads along said guide means in a feeding direction defining a conveying path, feeding trough means arranged upstream of said guide means, and a cutting device associated to said guide means, wherein additional conveyor means are arranged between said feeding trough means and said spear-shaped end of said guide means and have at least one entraining element which is moveable out of a rest position directly adjacent to the end of said feeding trough means facing said spear-shaped guide end by grasping behind said lower jaw arch of said fish head in the direction towards said spear-shaped end and almost tangential to the lower flank of said guide means.

2. A device as claimed in claim 1, wherein said additional conveyor means comprise oscillating crank means which are mounted pivotal about an axis arranged transverse to said conveying direction of said fish heads and below said guide means and are provided with said entraining element at their free end extending into said conveying path of said fish heads.

3. A device as claimed in claim 1, wherein said feeding trough means are provided with a guide edge extending along their middle, are formed tunnel-shaped, extend upwardly from a bottom of said feeding trough means and support said lower jaw between said jaw bones of said lower jaw arch.

4. A device as claimed in claim 2, wherein said feeding trough means are provided with a guide edge extending along their middle, are formed tunnel-shaped, extend upwardly from a bottom of said feeding trough means and support said lower jaw between said jaw bones of said lower jaw arch.

5. A device as claimed in claim 2, wherein said oscillating crank means are driven reversingly.

6. A device as claimed in claim 1, wherein a feeling device, displaceable by said fish head, is provided above the end of said guide edge facing said guide means for activating said oscillating crank means.

7. A device as claimed in claim 2, wherein a feeling device, displaceable by said fish head, is provided above the end of said guide edge facing said guide means for activating said oscillating crank means.

8. A device as claimed in claim 3, wherein a feeling device, displaceable by said fish head, is provided above the end of said guide edge facing said guide means for activating said oscillating crank means.

9. A device as claimed in claim 4, wherein a feeling device, displaceable by said fish head, is provided above the end of said guide edge facing said guide means for activating said oscillating crank means.

10. A device as claimed in claim 1, wherein said guide means, in the region of said spear-shaped end are provided with spreading flap means embedded in its lateral flanks, which flaps means are parted resiliently in such a manner by activation of said fish head carried by said guide means due to penetration of said pharynx that said flap means are guided by sliding between said gill cover and said jaw arches so that said gills are ripped out from said head.

* * * * *